3,806,465
THICKENED COMPOSITION HAVING CYANO-ETHYL ETHER OF A GALACTOMANNAN THEREIN AS THICKENER

Curtis L. Karl, Minneapolis, Minn., assignor to General Mills Chemicals Inc., Minneapolis, Minn.
No Drawing. Filed May 19, 1972, Ser. No. 254,968
Int. Cl. B01f 1/00; B01j 13/00
U.S. Cl. 252—316      9 Claims

ABSTRACT OF THE DISCLOSURE

Compositions comprising an organic liquid selected from formic acid, formamide, N,N-dimethyl formamide, acetic anhydride, acetonitrile and propylene carbonate thickened with cyanoethyl ethers of galactomannans.

---

This invention relates to thickening selected, organic liquids. More particularly, this invention relates to thickening selected, organic liquids with cyanoethyl ether of galactomannan gum.

The term "galactomannan" as used herein includes the general class of polysaccharides containing both galactose and mannose units. They are usually found in the endosperm sections of leguminous seeds such as guar, locust bean, tara, honey bean, flametree and cassia occidentalis. Cyanoethyl ether of galactomannans are obtained by reacting acrylonitrile with galactomannan gum thus substituting cyanoethyl groups onto the galactomannan polymer chain.

One method of preparing cyanoethyl ether of galactomannan having a degree of substitution of up to 1.8 is disclosed in U.S. Pat. 2,461,502, the disclosure of which is herein incorporated by reference. By degree of substitution as used herein is meant the substitution of ether groups per anhydro sugar unit. A method of making cyanoethyl ethers of galactomannans having degrees of substitution greater than 1.8 comprises heating water, acrylonitrile and the galactomannan gum at reflux under alkaline conditions and periodically diluted with water. In detail the cyanoethyl ethers of galactomannans having degrees of substitution greater than 1.8 can be made by the following procedure. Water, acrylonitrile and the galactomannan gum are added to a reactor along with an alkali metal hydroxide. The galactomannan is present in an amount of 100 to 300 parts, preferably 150 to 250 parts, per 1000 parts of reaction mixture. The water is present in a minimum amount of 100 parts by weight per 200 parts of gum. The acrylonitrile is present in an amount of 2 to 5 parts, preferably 2.5 to 3.5 parts by weight per part of gum. Therefore, the process uses acrylonitrile in an amount of 7.5 to 19 moles of acrylonitrile per mole of galactomannan gum and preferably about 11.3 moles of acrylonitrile per mole of gum wherein one mole of galactomannan is defined as 200 grams of galactomannan. The alkali metal hydroxide, preferably sodium hydroxide, is added with the water in a catalytic amount as an aqueous solution in a concentration of 0.75% to 1.25% to insure that the reaction is conducted under alkaline conditions. The reactants are stirred and heated to the reflux temperature and heating is continued until the mixture becomes very viscous, generally about 5 minutes of heating time. Sufficient water, preferably 0.25 to 1.0 part per part of galactomannan, is added to the heated solution to partially precipitate the reaction mixture and the mixture is heated until the viscosity is substantially the same as prior to the water addition. The procedure is repeated until the water added produces no substantial change in the viscosity of the mixture upon continued heating. The reaction mixture is then continuously heated for an additional period of time, preferably 15 minutes or greater, to insure completion of the reaction.

Thereafter, the mixture is neutralized, preferably with acetic acid followed by the addition of water in an amount of 0.25 to 1.0 part by weight of the acrylonitrile charged to the reactor. The mixture is heated and the excess acrylonitrile distilled off by gradually increasing the mixture temperature to the boiling point of water. The distillate which is obtained is comprised of two layers, the acrylonitrile-rich layer, i.e. up to 97% acrylonitrile, and the water layer, containing up to 7% acrylonitrile. The distillate removed can be used in the initial stages of the reaction. After distillation, the reactor is filled with water, stirred and allowed to settle. Two layers are formed during settling, the upper layer (which is turbid and brown) is decanted from the solids and the reactor again filled with water and stirred followed by settling. The upper layer is lighter in color than that obtained during the first settling. The procedure of decantation and the addition of water is continued until the upper layer is almost clear and colorless. The solids remaining in the lower layer are then filtered, dried and ground. The resulting product is a cyanoethyl ether of galactomannan gum having a degree of substitution of 1.8 or greater. Other methods of recovering the cyanoethyl ether of the galactomannan gum include centrifugation, filtration, etc.

It has now been found that cyanoethyl ether of galactomannan having a degree of substitution between about 1.0 and 2.7 will thicken formic acid, formamide, N,N-dimethyl formamide, acetic anhydride, acetonitrile and propylene carbonate. The preferred cyanoethyl ethers of galactomannans are those having degrees of substitution of about 1.8 to 2.7. All of these organic liquids are miscible with water. In the instance of formic acid containing water in amounts greater than about 5% by weight of the formic acid, the polymer degrades upon standing for periods longer than about one hour. Acetic anhydride in the presence of an equivalency of water hydrolyzes to acetic acid. The thickening power of the cyanoethyl ethers of galactomannans decreases as the concentration of acetic anhydride decreases. Cyanoethyl ethers of galactomannans do not thicken acetic acid itself. Formamide, N,N-dimethyl formamide, acetonitrile and propylene carbonate remain generally unchanged in the presence of water. Therefore, the thickening effect of the cyanoethyl ethers of galactomannans upon these organic liquids is not destroyed by the presence of water.

The above acid and amide solvents are useful in industrial cleaning operations. For example, the amide derivatives are useful in cleaning carbonaceous or greasy deposits. Thickening these solvents reduces dripping and splashing. The formic acid itself is used in de-enameling operations. Formic acid is also used to swell wool prior to dyeing. Thickening the acid allows the application and clinging of the acid to the textile. After the acid has been applied, water can then be added for whatever purpose desired. The addition of water dissipates the thickening effect of the cyanoethyl ethers of galactomannan and permits the solvent to be washed off the item to which they have been applied. Propylene carbonate is used in the purification of natural gas. Acetic anhydride is used as a dehydrating and acetylating agent in the production of pharmaceuticals, dyes, perfumes and explosives. Acetonitrile is, among other uses, a specialized solvent. When used as a solvent for materials to be applied as coatings, thickening reduces dripping.

Cyanoethyl ether of galactomannan is preferably used in amounts of about 0.25% to 2.0% by weight of the organic liquids. When concentrations in the higher portion of the range are used, heavy thickening or gels can be obtained. The cyanoethyl ether of galactomannan can be incorporated into the solvents by stirring the dry gum into the solvent and allowing the dispersion to stand until the gum solvates, usually about one to 24 hours. Thickening increases as the gum solvates.

The thickening effect of cyanoethyl ether of galactomannan is illustrated in the specific examples set out below.

EXAMPLE I

The solvents shown in the table all containing less than 5% water were weighed into 346 gram samples. Each sample was stirred vigorously with an electric stirrer. To each sample was added 3.5 grams of cyanoethyl guar having a degree of substitution of $2.0 \pm 0.1$. The mixture was stirred with an electric stirrer for a period of ten minutes to achieve dispersion. The dispersion was then allowed to stand for a period of 24 hours. The solvents tested and the viscosity of final dispersion are shown in the table. The viscosities were measured with a Brookfield Viscometer equipped with a No. 2 spindle rotating at 20 r.p.m.

TABLE

| Solvent: | Viscosity, cps. |
|---|---|
| Formic acid (containing 3% water) | 50 |
| Acetonitrile | 430 |
| Acetic anhydride | 868 |
| Formamide | 2600 |
| N,N-dimethyl formamide | 464 |
| Propylene carbonate | 2425 |

EXAMPLE II

To a 346 gram sample of formic acid containing 12% water by weight was added 3.5 grams of cyanoethyl guar having a degree of substitution of $2.0 \pm 0.1$. The mixture was stirred with an electric stirrer for a period of ten minutes to achieve dispersion. The dispersion was then allowed to stand for a period of one hour. The viscosity of the dispersion after one hour was 1130 centipoise as measured by a Brookfield Viscometer equipped with a No. 2 spindle rotating at 20 r.p.m. After one hour the viscosity began to decrease.

The embodiments of the invention in which an exclusive property or privilege is claimed are defined as follows:

1. A thickened composition consisting essentially of an organic liquid selected from the group consisting of formic acid, formamide, N,N-dimethyl formamide, acetic anhydride, acetonitrile and propylene carbonate and a cyanoethyl ether of a galactomannan having a degree of substitution of about 1.0 to 2.7 in the amount of about 0.25% to 2.0% by weight of the organic liquid.

2. The composition of claim 1 wherein the cyanoethyl ethers of galactomannan have degrees of substitution between about 1.8 and 2.7.

3. The composition of claim 1 wherein the organic liquid is formic acid.

4. The composition of claim 3 wherein the formic acid contains less than about 5% water by weight.

5. The composition of claim 1 wherein the organic liquid is formamide.

6. The composition of claim 1 wherein the organic liquid is N,N-dimethyl formamide.

7. The composition of claim 1 wherein the organic liquid is acetic anhydride.

8. The composition of claim 1 wherein the organic liquid is acetonitrile.

9. The composition of claim 1 wherein the organic liquid is propylene carbonate.

References Cited

UNITED STATES PATENTS

| 3,635,836 | 1/1972 | Mullen | 252—316 |
| 2,461,502 | 2/1949 | Moe | 260—209 R |
| 2,200,391 | 5/1940 | Freeman | 106—311 UX |
| 3,317,329 | 5/1967 | Williams | 106—208 X |
| 3,382,181 | 5/1968 | Oberdorfer, Jr. | 252—364 X |
| 2,868,732 | 1/1959 | Truc | 252—145 X |

RICHARD D. LOVERING, Primary Examiner

U.S. Cl. X.R.

8—Dig. 3; 106—208, 311; 252—145, 155, 193, 194, 364, 544, Dig. 8